(12) United States Patent
Nadeau et al.

(10) Patent No.: US 12,344,335 B2
(45) Date of Patent: Jul. 1, 2025

(54) TRACK AND WHEEL FOR A TRACK SYSTEM, AND TRACK SYSTEM COMPRISING THE SAME

(71) Applicant: SOUCY INTERNATIONAL INC., Drummondville (CA)

(72) Inventors: Marc Nadeau, Drummondville (CA); Olivier Lacharite, Wickham (CA); Jordan Boisvert, Saint-Cyrille-de-Wendover (CA); Eric Halstead, Ste-Marie-Madeleine (CA); Leila Brion, Drummondville (CA); Magella Bedard, Drummondville (CA); Francois Laflamme, St-Germain-de-Grantham (CA); Marc-Antoine Leblanc, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 18/489,676

(22) Filed: Oct. 18, 2023

(65) Prior Publication Data

US 2024/0043078 A1 Feb. 8, 2024

Related U.S. Application Data

(63) Continuation of application No. 17/911,035, filed as application No. PCT/IB2021/052707 on Mar. 31, 2021, now Pat. No. 11,866,107.

(Continued)

(51) Int. Cl.
*B62D 55/24* (2006.01)
*B62D 55/06* (2006.01)
*B62D 55/14* (2006.01)

(52) U.S. Cl.
CPC .......... *B62D 55/24* (2013.01); *B62D 55/062* (2013.01); *B62D 55/14* (2013.01)

(58) Field of Classification Search
None
See application file for complete search history.

(56) References Cited

U.S. PATENT DOCUMENTS

| | | | |
|---|---|---|---|
| 2,621,085 A | 12/1952 | Bonmartini |
| 2,661,249 A | 12/1953 | Bonmartini |
| (Continued) | | |

FOREIGN PATENT DOCUMENTS

| | | |
|---|---|---|
| JP | 2001097259 | 4/2001 |
| JP | 2003040155 A | 2/2003 |
| (Continued) | | |

OTHER PUBLICATIONS

Sparks, Motorized Pulleys Crowned Pulleys, retrieved from http://www.sparksbelting.com/blog/crowned-pulleys-which-option-is-right-for-you.

(Continued)

*Primary Examiner* — Jason R Bellinger
(74) *Attorney, Agent, or Firm* — BCF LLP

(57) ABSTRACT

A track for a track system includes an endless elastomeric carcass having a wheel-facing side defining a wheel path for engaging wheels of the track system, and a ground-facing side opposite the wheel-facing side. A plurality of lugs project from the wheel-facing side. Each lug has a base and a side wall extending from the base. The base is distanced from the ground-facing side by a first distance. The wheel path has a first track side portion extending adjacent the base of at least some lugs of the plurality of lugs. The base defines an undercut extending between the side wall and the first track side portion of the wheel path. The undercut defines a recess extending inwardly towards a lateral center of the (Continued)

track, and has a bottom. The first distance extends between the bottom of the undercut and the ground-facing side of the track.

9 Claims, 15 Drawing Sheets

Related U.S. Application Data

(60) Provisional application No. 63/003,083, filed on Mar. 31, 2020, provisional application No. 63/003,076, filed on Mar. 31, 2020.

(56) References Cited

U.S. PATENT DOCUMENTS

| | | | |
|---|---|---|---|
| 3,054,644 A | 9/1962 | Hausmann | |
| 3,649,085 A | 3/1972 | Comellas | |
| 5,022,718 A | 6/1991 | Diekevers | |
| 5,295,741 A | 3/1994 | Togashi et al. | |
| 5,358,064 A | 10/1994 | Oertley | |
| 5,447,365 A | 9/1995 | Muramatsu et al. | |
| 5,704,697 A | 1/1998 | Ketting et al. | |
| 5,938,301 A | 8/1999 | Hostetler et al. | |
| 6,079,802 A | 6/2000 | Nishimura et al. | |
| 8,083,297 B2 | 12/2011 | Fujita | |
| 9,033,431 B1 | 5/2015 | Zuchoski et al. | |
| 9,216,784 B2 | 12/2015 | Hagio | |
| 9,409,613 B2 | 8/2016 | Hakes | |
| 9,415,818 B1 | 8/2016 | Tiede et al. | |
| 9,545,964 B2 | 1/2017 | Shimozono | |
| 10,266,218 B2 | 4/2019 | Neyer et al. | |
| 10,501,131 B2 | 12/2019 | Dumoulin et al. | |
| 10,710,653 B2 | 7/2020 | Peterson | |
| 11,866,107 B2 * | 1/2024 | Nadeau | B62D 55/062 |
| 2005/0253453 A1 | 11/2005 | Miller | |
| 2008/0211299 A1 | 9/2008 | Wilt | |
| 2009/0302677 A1 | 12/2009 | Sugihara | |
| 2011/0068620 A1 * | 3/2011 | Delisle | B62D 55/24 |
| | | | 305/165 |
| 2011/0079452 A1 | 4/2011 | Poirier | |
| 2018/0148110 A1 | 5/2018 | Mizusawa et al. | |
| 2019/0144055 A1 | 5/2019 | Zuchoski | |
| 2022/0028318 A1 | 1/2022 | Ji et al. | |

FOREIGN PATENT DOCUMENTS

| | | |
|---|---|---|
| JP | 2010006226 A | 1/2010 |
| WO | 2017139356 A2 | 8/2017 |
| WO | 2020049532 A2 | 3/2020 |

OTHER PUBLICATIONS

English abstract of JP2001097259 retrieved from Espacenet on Sep. 8, 2022.
English abstract of JP2003040155 retrieved from Espacenet on Mar. 31, 2023.
English abstract of JP2010006226 retrieved from Espacenet on Mar. 31, 2023.
Extended European Search Report, Mar. 28, 2024, The Hague, Thiercelin, A.

* cited by examiner

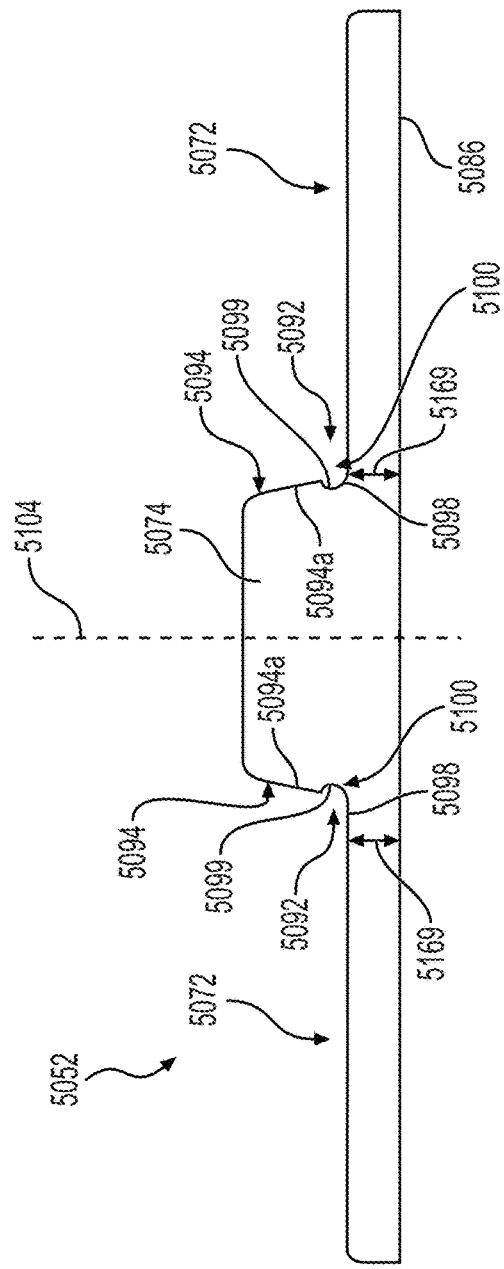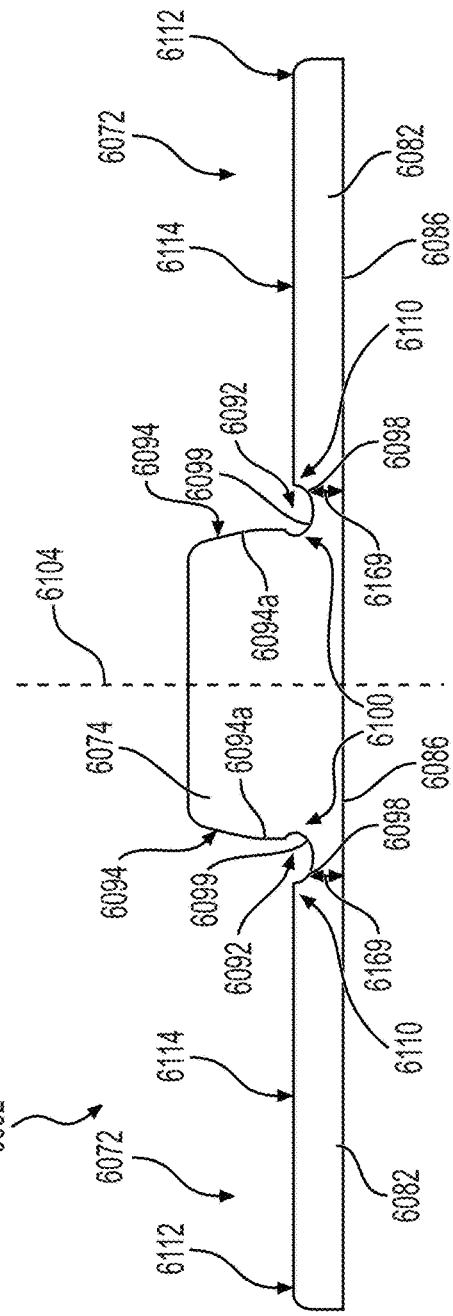

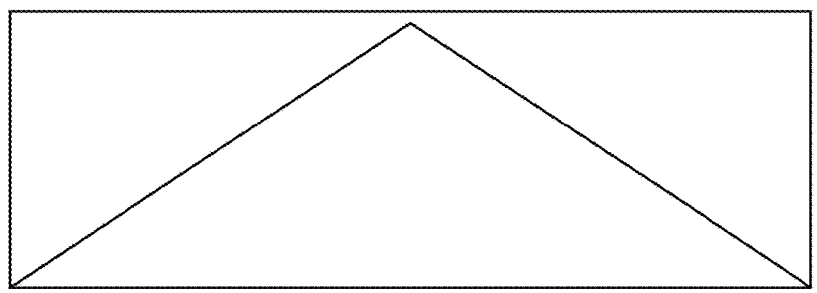
FIG. 16A
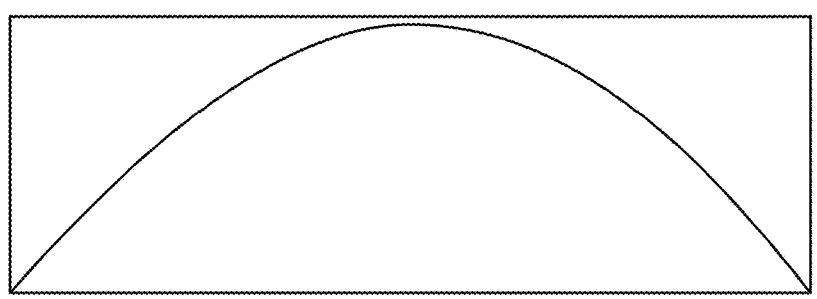
FIG. 16B
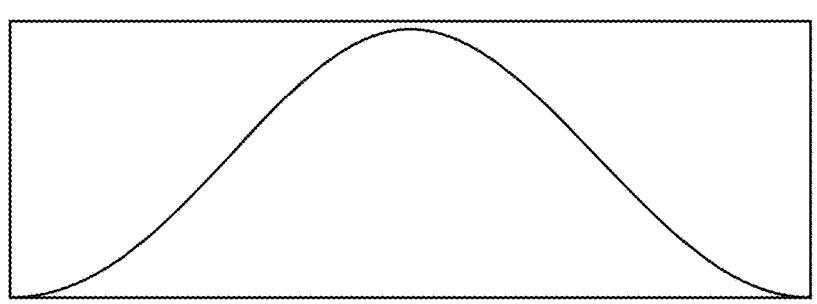
FIG. 16C
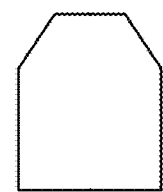 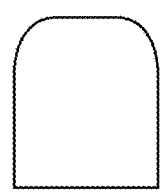 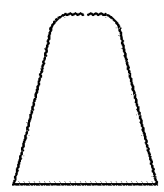
FIG. 16D  FIG. 16E  FIG. 16F

TRACK AND WHEEL FOR A TRACK SYSTEM, AND TRACK SYSTEM COMPRISING THE SAME

CROSS-REFERENCE TO RELATED APPLICATION

The present application is a Continuation Application of U.S. patent application Ser. No. 17/911,035, filed on Sep. 12, 2022, now U.S. Pat. No. 11,866,107, which application is a National Stage of International Application No. PCT/IB2021/052707, filed on Mar. 31, 2021, entitled "*Endless Track with Convex Support Wheel Path*", and which claims priority to U.S. Provisional Patent Application No. 63/003,083 filed Mar. 31, 2020,entitled "Endless Track With Convex Support Wheel Path", the entirety of all of which is incorporated herein.

TECHNICAL FIELD

The present technology relates generally to track systems for vehicles, and more particularly to tracks and wheels for heavy vehicles, including agricultural vehicles.

BACKGROUND

Certain vehicle types, such as, for example, industrial vehicles (e.g., harvesters, tractors, bulldozers, loaders etc.), military vehicles (e.g., tanks, carriers, etc.) and off-road vehicles (e.g., all terrain vehicles, utility task vehicles, etc.) are used to operate over ground surfaces that are soft, slippery and/or uneven (e.g., soil, mud, sand, rocks, debris, ice, snow, etc.).

Conventionally, such vehicles have had large wheels equipped with tires. Under certain conditions, such tires may provide insufficient traction when such vehicles operate on some ground surfaces and, as these vehicles are generally heavy, the ground surface may yield under the pressure exerted by the tires, as the weight of the vehicles is concentrated onto small areas.

In order to reduce the aforementioned drawbacks, to increase traction and to enhance stability of the vehicles, track systems were developed to be used in place of at least some of the tire-equipped wheels typically used on such vehicles. Track systems are equipped with tracks designed in accordance with the type of vehicle on which the track system is going to be installed.

For example, WO2014138938A1 describes a track for traction of an off-road vehicle such as an agricultural vehicle, a construction vehicle, a snowmobile, or another vehicle operable off-road. The track is mountable around a track-engaging assembly comprising a drive wheel, idler wheel assemblies and support wheel assemblies. The track is elastomeric to be flexible and wrapped around the track-engaging assembly. The track comprises a wheel-facing side for facing the wheels of the track-engaging assembly. The wheel-facing side includes a plurality of drive lugs and/or guide lugs projecting from the wheel-facing side for engaging the drive wheel, the idler wheel assemblies and the support wheel assemblies. The idler and support wheel assemblies have laterally spaced-apart wheels engaging the wheel-facing side of the endless track on either side of the drive/guide lugs in order to prevent the track from being dismounted from the track engaging assembly. The track further has a ground-facing side configured for engaging the ground, and a plurality of traction projections projecting from the ground-facing side.

It is known in the art that the drive/guide lugs provided on the wheel-facing side of the track are subjected to the repeated passage of the idler and support wheels, which creates a zone of relatively high pressure in the traction projection underlying the wheels, and consequently, a high temperature elevation in said traction projection. Furthermore, another issue is that the edge of the idler and support wheels near the drive/guide lugs creates a high shear stress in the track at the base of said drive/guide lugs.

These two effects typically significantly reduce the durability of the endless track by either overheating at least some of the materials forming the endless track (such as rubber-based materials) under the idler and/or support wheels, and/or by initiating cracks near the base of drive/guide lugs that will eventually propagate under the drive/guide lugs and weaken the drive/guide lugs until they are no longer strong enough to hold the driving force induced by the drive wheel. A non-reversible failure (i.e. delamination) commonly occurs at this stage.

Different solutions have been developed over time to mitigate these issues. Solutions include reinforcing the drive/guide lugs, especially with reinforcing members extending their base footprint, either inside or outside the carcass of the endless track. Efforts have also been made to add relatively soft material (e.g. rubber) on the external surface of the support wheels to reduce the stress induced to the region of the wheel-facing side of the endless track adjacent the bases of the drive/guide lugs. However, the load/pressure distribution still is not distributed evenly enough in these regions of the endless track. Even if the endless track or its drive/guide lugs are reinforced, the above-mentioned features still do not mitigate the issues of premature wear of the endless track mentioned above to a satisfying degree.

Therefore, there remains a desire for improvements in the design and configuration of components of track systems for further mitigating at least some of the aforementioned issues.

SUMMARY

Prior art tracks, such as the example prior art tracks described above, have a number of drawbacks. In one aspect, where tracks are implemented with heavy vehicles, such as agricultural vehicles (tractors, harvesters, etc.), changes to features and aspects of the components of the track system, including changes that may at least at a first glance appear to persons who are not skilled in the art to be trivial, may in fact have technical implications for such vehicles.

In accordance with one aspect of the present technology, there is provided a track for a track system having a plurality of wheels for supporting the track on a ground surface, the track system being configured to support a nominal load, the track including an endless elastomeric carcass having a wheel-facing side for engaging the plurality of wheels, and a ground-facing side opposite the wheel-facing side for engaging the ground surface, the endless elastomeric carcass being resiliently deformable, a plurality of lugs projecting from the wheel-facing side, each lug of the plurality of lugs having a base and a side wall extending from the base, the base being distanced from the ground-facing side by a first distance, the wheel-facing side defining a wheel path on which the plurality of wheels rolls on, the wheel path having a first track side portion extending adjacent the bases of at least some lugs of the plurality of lugs, a second track side portion opposite the first track side portion, and an intermediate track portion located between the first and second track side portions, the intermediate track portion being distanced from the ground-facing side by a second distance, in response to one wheel of the plurality of wheels rolling on the wheel path and the track system supporting a first load being smaller than the nominal load, the track is resiliently deformed under the wheel and the second distance is greater than the first distance, and in response to one wheel of the plurality of wheels rolling on the wheel path and the track system supporting a second load being equal or greater than the nominal load, the track is further resiliently deformed under the wheel and the second distance is substantially equal to or smaller than the first distance.

In some embodiments, the first track side portion is distanced from the ground-facing side by a third distance, the second track side portion is distanced from the ground-facing side by a fourth distance, the intermediate track portion defines a track apex being distanced from the ground-facing side by the second distance being greater than at least one of the first, third and fourth distances.

In some embodiments, the second distance is greater than the third and fourth distances.

In some embodiments, the track apex is located closer to the first track side portion than the second track side portion.

In some embodiments, a cross-section of the elastomeric carcass at the wheel path has a shape being one of an arcuate shape, a V-shape, a cosine shape, a sine shape, a truncated triangle shape, a dome shape, and a trapezoidal shape.

In some embodiments, the base further includes a fillet extending between the side wall and the first track side portion of the wheel path, the fillet having a bottom, and the first distance extends between the bottom of the fillet and the ground-facing side of the track.

In some embodiments, at least one wheel of the plurality of wheels has a flange for engaging the side wall of at least one lug of the plurality of lugs, in response to the track system supporting the first load and the at least one wheel rolling on the wheel path, a first region of the side wall of the at least one lug is engageable by the flange, and in response to the track system supporting the second load and the at least one wheel rolling on the wheel path, the first region and a second region of the side wall of the at least one lug is engageable by the flange.

In some embodiments, the base defines an undercut extending between the side wall and the first track side portion of the wheel path, the undercut having a bottom, and the first distance extends between the bottom of the undercut and the ground-facing side of the track.

In some embodiments, the base further defines a recess extending laterally toward a lateral center of the track further than at least a portion of the side wall.

In accordance with another aspect of the present technology, there is also provided a wheel for a track system, the track system being configured to support a nominal load and having an endless track having a resiliently deformable, elastomeric carcass having a ground-facing side and a wheel-facing side opposite the ground-facing side, the wheel being configured for rolling on a wheel path defined on the wheel-facing side of the endless track, the wheel including a hub portion defining a rotation axis of the wheel, and a resilient annular rim portion connected to the hub portion, the resilient annular rim portion having an engagement surface extending around the rotation axis and including a first wheel side portion being distanced from the rotation axis by a first distance, a second wheel side portion opposite the first wheel side portion, the second wheel side portion being distanced from the rotation axis by a second distance, and an intermediate wheel portion located between the first and second wheel side portions, the intermediate wheel portion being distanced from the rotation axis by a third distance, in response to the wheel rolling on the wheel path and the track system supporting a first load being smaller than the nominal load, at least one of the annular rim portion and the endless track is resiliently deformed and the third distance is greater than at least one of the first and second distances, and in response to the wheel rolling on the wheel path and the track system supporting a second load being equal or greater than the nominal load, the annular rim portion and the endless track are resiliently deformed further and the third distance is substantially equal to or smaller than at least one of the first and second distances.

In some embodiments, in response to the wheel rolling on the wheel path and the track system supporting the first load, the third distance is greater than the first and second distances.

In some embodiments, the wheel further includes a flange connected to the resilient annular rim portion, the flange being configured for engaging a side wall of at least one lug of a plurality of lugs projecting from the wheel-facing side of the endless track, in response to the track system supporting the first load and the wheel rolling on the wheel path, the flange of the wheel is engageable to a first region of the side wall of the at least one lug, and in response to the track system supporting the second load and the wheel rolling on the wheel path, the flange of the wheel is engageable to the first region and a second region of the side wall of the at least one lug.

In some embodiments, the intermediate wheel portion defines a wheel apex, and the third distance extends between the wheel apex and the rotation axis.

In some embodiments, the wheel apex is located closer to the first wheel side portion than the second wheel side portion.

In accordance with yet another aspect of the present technology, there is provided a track system for a vehicle, the track system being configured to support a nominal load, the track system including an endless track having a resiliently deformable elastomeric carcass having a wheel-facing side defining a wheel path and a ground-facing side opposite the wheel-facing side, the wheel path having a first track side portion, a second track side portion opposite the first track side portion, and an intermediate track portion located between the first and second track side portions, the intermediate track portion extending further away from the ground-facing side than the first and second side track portions, and a track-engaging assembly including a wheel configured for rolling on the wheel path, the wheel having a hub portion defining a rotation axis of the wheel and a resilient annular rim portion connected to the hub portion, the resilient annular rim portion having an engagement surface extending around the rotation axis, the engagement surface having a first wheel side portion, a second wheel side portion opposite the first wheel side portion, and an intermediate wheel portion located between the first and second wheel side portions, the intermediate wheel portion extending further away from the rotation axis than the first and second wheel side portions, in response to the wheel rolling on the wheel path and the track system supporting a first load being smaller than the nominal load, at least one of the endless track and the annular rim portion is resiliently deformed, the intermediate track portion extends further away from the ground-facing side than the first and second track side portions, and the intermediate wheel portion extends further away from the rotation axis than the first and second wheel side portions, and in response to the wheel rolling on the wheel path and the track system supporting a second load being equal or greater than the nominal load, the endless track and the annular rim portion are resiliently deformed further, the intermediate track portion extends closer to ground-facing side of the endless track, and the intermediate wheel portion extends closer to the rotation axis of the wheel.

In some embodiments, in response to the wheel rolling on the wheel path and the track system supporting the second load, the intermediate track portion is distanced from the ground-facing side by a first distance being substantially equal to a second distance extending between one of the first and second track side portions and the ground-facing side.

In some embodiments, in response to the wheel rolling on the wheel path and the track system supporting the second load, the intermediate wheel portion is distanced from the rotation axis by a third distance being substantially equal to a fourth distance extending between one of the first and second wheel side portions and the rotation axis of the wheel.

In some embodiments, the track further includes a plurality of lugs projecting from the wheel-facing side of the track, each lug of the plurality of lugs having a base and a side wall extending from the base, the base having a bottom, and in response to the wheel rolling on the wheel path and the track system supporting the second load, the intermediate track portion is distanced from the ground-facing side by a fifth distance being substantially equal to or smaller than a sixth distance extending between the bottom of the base and the ground-facing side of the endless track.

In some embodiments, a cross-section of at least one of the elastomeric carcass at the wheel path and the resilient annular rim portion has a shape being one of an arcuate shape, a V-shape, a cosine shape, a sine shape, a truncated triangle shape, a dome shape, and a trapezoidal shape.

For purposes of the present application, terms related to spatial orientation when referring to a track system and components in relation to a vehicle equipped with the track system, such as "vertical", "longitudinal", "lateral", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground. Also for clarity, the present application uses the terms "down" and "downward" to indicate a direction, for example of forces, that is parallel to and is in the direction of the force of gravity.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

In the present application, the expression "distance" is understood to be a shortest distance between two points or two surfaces. When the distances mentioned in the present application relate to the ground-facing side of the endless track, the surface of reference on the ground-facing side is a top wall of a traction projection projecting from the ground-facing side. Therefore, when the traction projection has a substantially flat profile and engages flat, level ground, the surface of reference corresponds to the interface between the flat, level ground and the top wall of the traction projection engaging the ground.

In the present application, the expression "substantially equal" is used herein to compare two quantities, explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the expression "substantially equal" in the context of comparing two quantities refers to a value or range that is within 20%, preferably within 15%, more preferably within 10%, more preferably within 9%, more preferably within 8%, more preferably within 7%, more preferably within 6%, and more preferably within 5% of the given value or range.

In the present application, the term "about" is used herein, explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. For example, the term "about" in the context of a given value or range refers to a value or range that is within 20%, preferably within 15%, more preferably within 10%, more preferably within 9%, more preferably within 8%, more preferably within 7%, more preferably within 6%, and more preferably within 5% of the given value or range.

Explanations and/or definitions of terms provided in the present application take precedence over explanations and/or definitions of these or similar terms that may be found in any documents incorporated herein by reference.

BRIEF DESCRIPTION OF THE DRAWINGS

For a better understanding of the present technology, as well as other aspects and further features thereof, reference is made to the following description which is to be used in conjunction with the accompanying drawings, where:

FIG. 15A is a schematic representation of a vertical and lateral cross-section of a track being yet another embodiment of the track of FIG. 3, with undercuts defined in the side walls of the lug;

FIG. 15B is a schematic representation of a vertical and lateral cross-section of a track being yet another embodiment of the track of FIG. 3, with undercuts defined in the side walls of the lug and in the wheel paths; and FIGS. 16A-16F are schematic representations of shapes suitable for the cross-section of a wheel path of a track and an engagement surface of a wheel of a track system.

It should be noted that the Figures are not necessarily drawn to scale and some features shown in the Figures (for example, features such as a cross-section of the wheel path being of an arcuate shape) may be exaggerated relative to their possible "life" sizes and dimensions, in order to make these features clearly visible in the figures.

DETAILED DESCRIPTION

Figure 1:
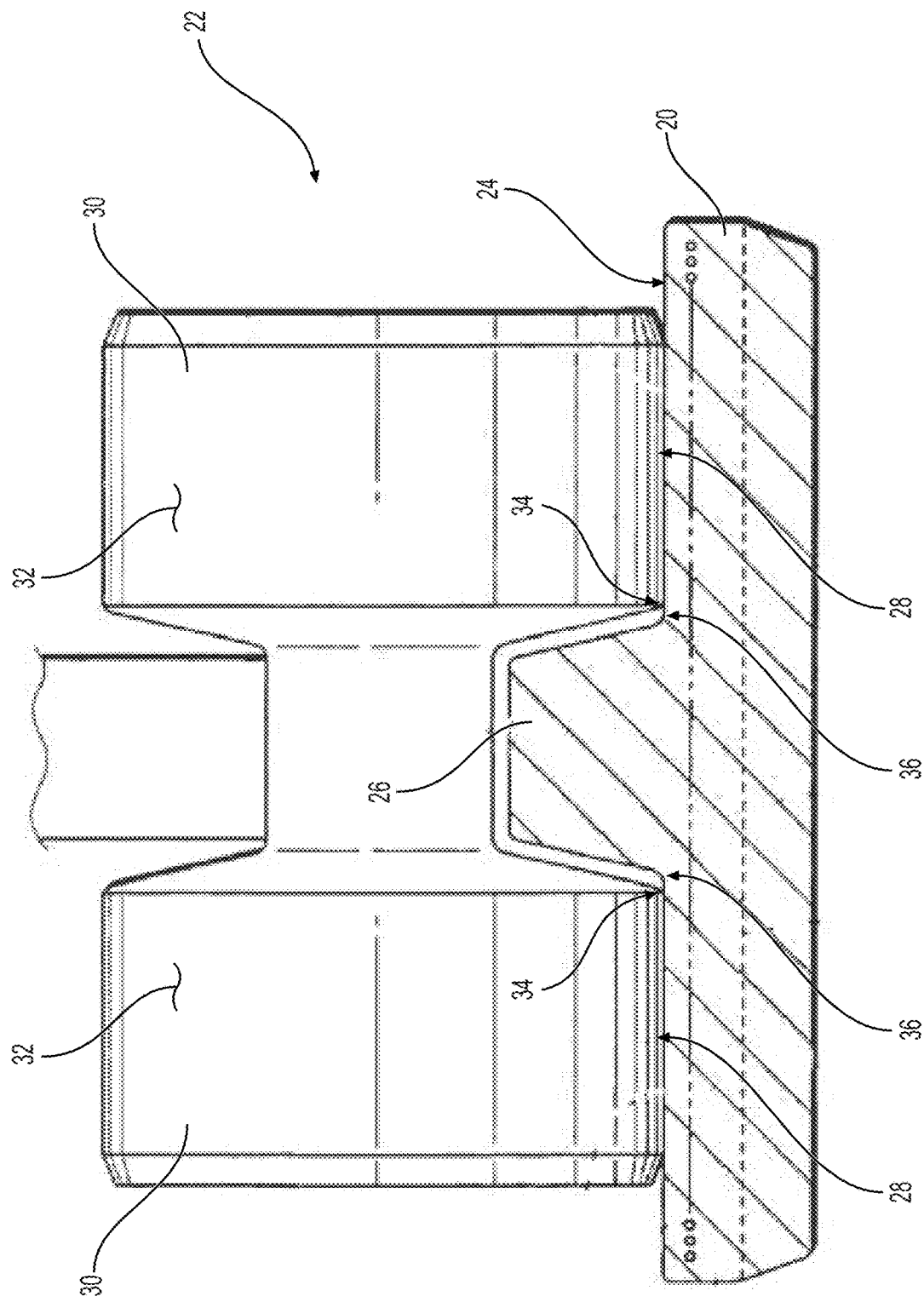
FIG. 1 is a vertical and lateral cross-sectional view of a track and a wheel assembly engaging a wheel-facing side of the track in accordance with technologies part of the prior art.

In FIG. 1, there is presented a cross-section view of a track 20 and a wheel assembly 22 engaging a wheel-facing side 24 of the track 20 in accordance with technologies part of the prior art. The track 20 has drive lugs 26 defined in central portion thereof and projecting from the wheel-facing side 24. The track 20 further has two wheel paths 28 on which wheels 30 of the wheel assembly 22 roll on. The wheel paths 28 are substantially flat and an engagement surface 32 of the wheels is also substantially flat. As mentioned above, this configuration of the wheel paths 28 and engagement surfaces 32 cause the edge 34 of the wheel 30 near the drive lug 26 to create a high shear stress at a base 36 of the drive lug 26 when the each wheel 30 rolls on the corresponding wheel path 28.

The present technology is directed, among other things, at assisting in reducing the amount of shear stress near or at the base 36 of the drive lug 26.

Different embodiments of present technology will now be described with reference to the accompanying drawings, which are provided herein for illustrative purposes only and are not intended to be limiting. Although the present technology is described in terms of specific illustrative embodiments, it is to be understood that the embodiments described herein are by way of example only and that the scope of the technology is not intended to be limited thereby. As a person skilled in the art would understand, various embodiments of the present technology may be of a greater complexity than what is described herein.

Figure 2:
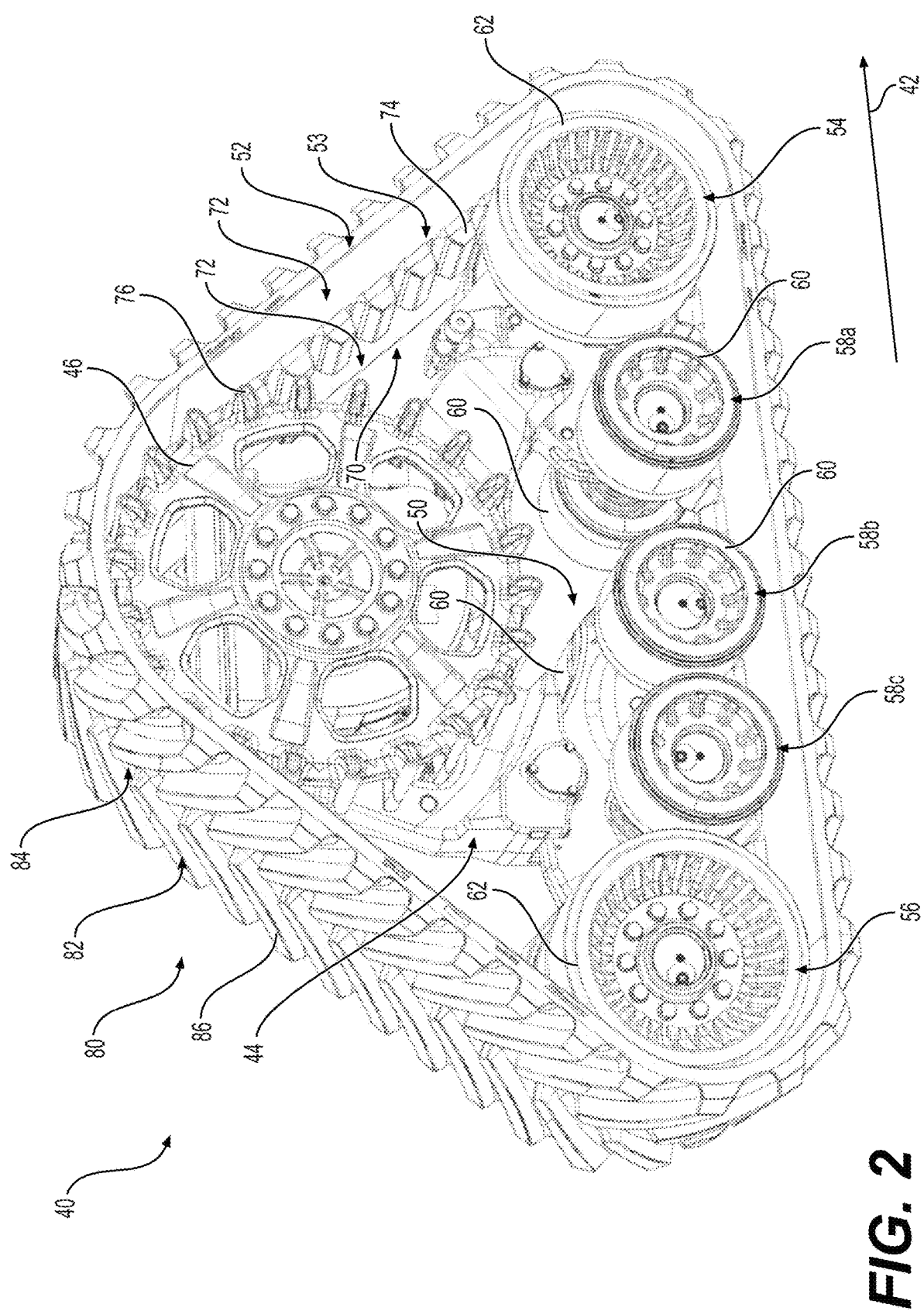
FIG. 2 is a perspective view taken from a top, rear, right side of a track system in accordance with the present technology, the track system being configured for being mounted to a right side of a vehicle.

Referring to FIG. 2, a track system 40 configured for being mounted to a right side of a vehicle (not shown) is presented. The track system 40 is configured for being driven in a forward travel direction indicated by arrow 42. The track system 40 includes a frame assembly 44 operatively connected to the vehicle, a drive wheel 46 rotatably connected to the frame assembly 44 and being driven by a laterally extending drive shaft (not shown) of the vehicle, and a track engaging assembly 50 operatively connected to the frame assembly 44 for supporting and engaging an endless elastomeric track 52. The track 52 includes an endless elastomeric carcass 53.

The track engaging assembly 50 includes a leading idler wheel assembly 54, a trailing idler wheel assembly 56, and three support wheel assemblies 58a, 58b, 58c disposed longitudinally between the leading and trailing idler wheel assemblies 54, 56. The support wheel assemblies 58a, 58b, 58c include two laterally spaced support wheels 60. The leading and trailing idler wheel assemblies 54, 56 also include two laterally spaced idler wheels 62 being of greater size than the support wheels 60.

The wheels 60, 62 engage a wheel-facing side 70 of the endless track 52. Two laterally spaced apart wheel paths 72 are defined on the wheel-facing side 70 of the track 52. Drive lugs 74 project from a central region of the wheel-facing side 70 and extend between the wheel paths 72. The drive lugs 74 are sized and configured for being engaged by teeth 76 provided on the drive wheel 46 for driving the track 52. The drive lugs 74 also extend between the laterally spaced apart support wheels 60 and idler wheels 62 for maintaining a widthwise alignment of the track 52 relative to the wheels 60, 62 and for preventing the track 52 from being dismounted from the track engaging assembly 50.

It is contemplated that the track 52 could further include guide lugs for assisting maintaining a widthwise alignment of the track 52 relative to the wheels 60, 62 and for preventing the track 52 from being dismounted from the track engaging assembly 50. The present technology will be described with reference to the drive lugs 74, but it is contemplated that the present technology could be implemented on tracks 52 also including guide lugs. The term "lug" employed hereinafter is thus contemplated to correspond to a drive lug or a guide lug.

Figure 4:
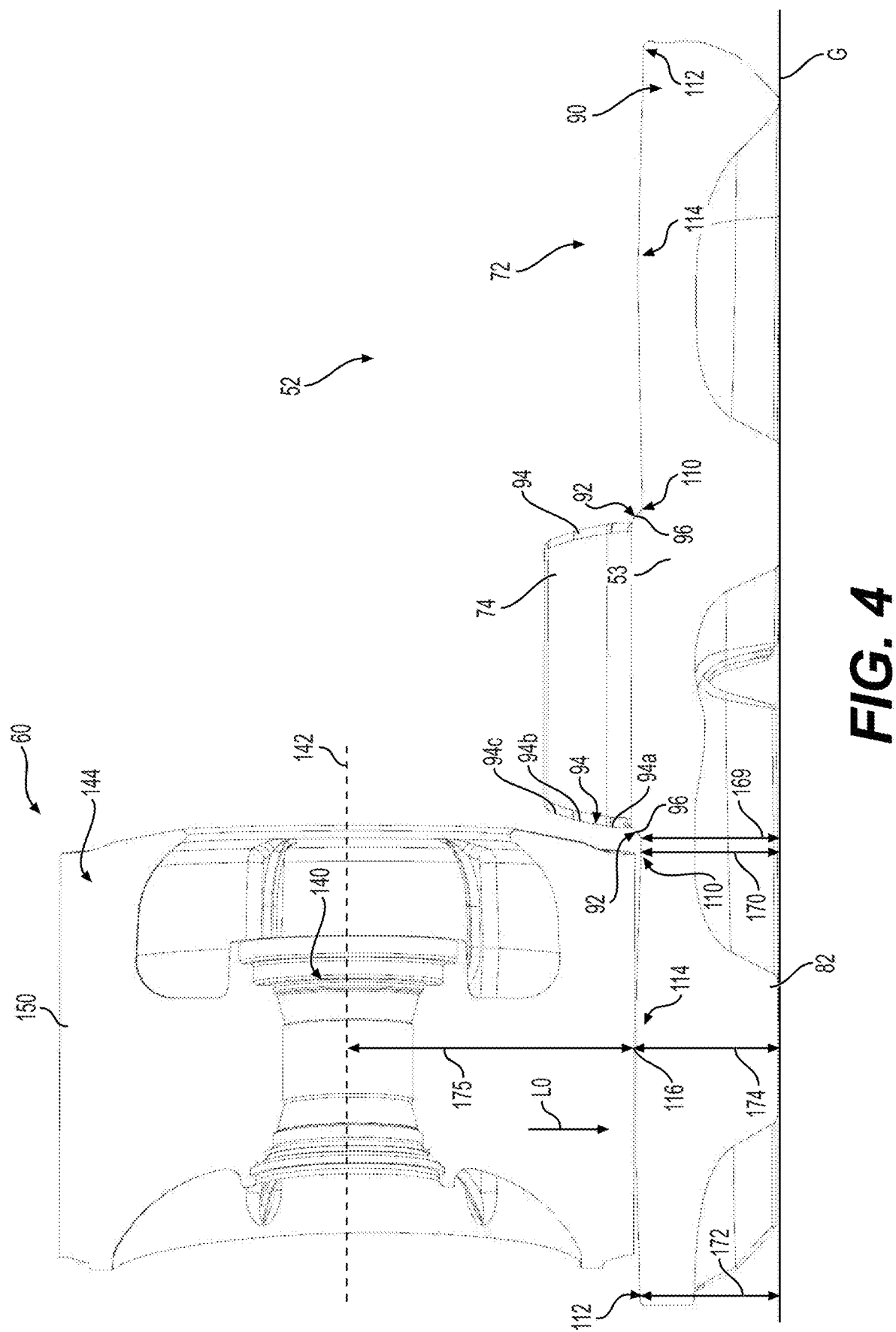
FIG. 4 is a cross-section view of the track and support wheel of FIG. 3 taken along cross-section line X-X of FIG. 3, with the track having a wheel path with a convex profile, the support wheel having an engagement surface with a flat profile, and the track system supporting a load being smaller than a nominal load.

Opposite the wheel-facing side 70, the track 52 has a ground-facing side 80 configured for engaging the ground surface G (FIG. 4). Traction projections 82 project from the ground-facing side 80 and form a tread 84 selected for the type of ground surface G on which the track system 40 is destined to travel. The traction projections 82 transfer driving forces that the track 52 receives from the vehicle through the drive wheel 46 into the ground surface G for driving the vehicle when the traction projections 82 engage the ground surface G. Each one of the traction projections 82 has a top wall 86 that is pressed against the ground surface G when the track system 40 is operated.

When the wheels 60, 62 roll on their respective wheel path 72 for supporting the track 52, the wheels 60, 62 apply downward force to the endless track 52 and spread the load supported by the track system 40 on the ground surface G. The track system 40 is structured and configured to support a nominal load L1. In the present description, the nominal load L1 of the track system 40 corresponds to the track system 40 being attached to the vehicle with the track system 40 bearing its ordinary portion of the weight of the vehicle when the vehicle is at its tare weight, with no attachments at the front or rear and no payload in its container or tank. Should a payload be carried by the vehicle, the load supported by the track system 40 becomes greater than the nominal load L1. Such load will be referred hereinafter as L2. Conversely, should the track system 40 be disconnected from the vehicle and be self-supported on the ground surface G, the load supported by the track system 40 would correspond to the weight of the track system 40 and be smaller than the nominal load L1. Such load will be referred hereinafter as load L0.

Figure 3:
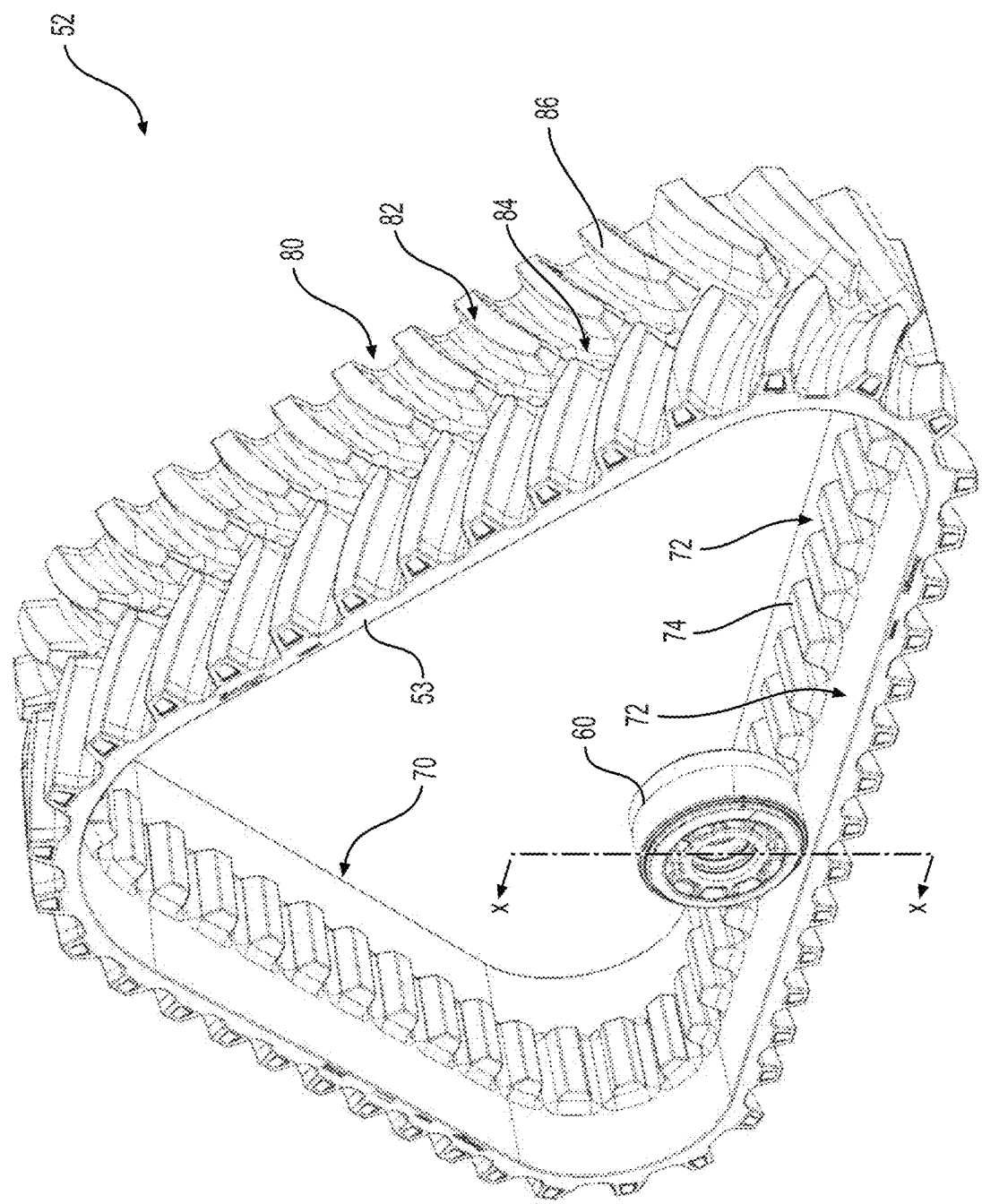
FIG. 3 is a perspective view taken from a top, front, right side of an endless track and one support wheel of the track system of FIG. 2.
Figure 5:
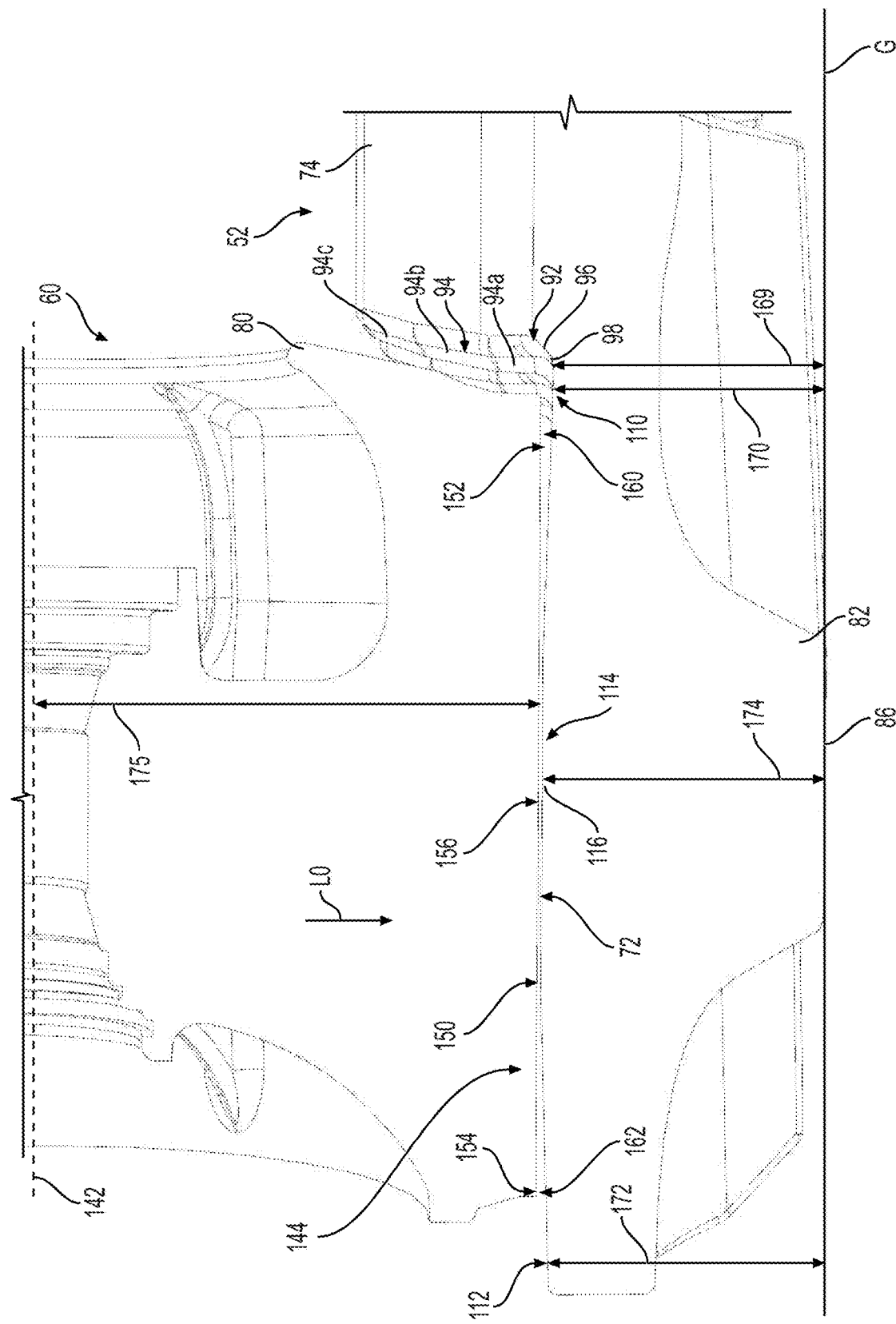
FIG. 5 is a close-up view of portion 5 of FIG. 4.

Turning to FIGS. 3 to 5, the endless track 52 and one support wheel 60 will be further described. The description refers to one of the support wheels 60 from the support wheel assembly 58*b*, but it is contemplated that the following description could apply to any one of the wheels 60, 62 of the track system 40.

As best seen in FIG. 4, the carcass 53 has a substantially rectangular widthwise cross-section 90 that is positioned such that when the track 52 is being driven and the vehicle drives over substantially planar ground surface G, the substantially rectangular widthwise cross-section 90 of the carcass 53 is substantially parallel to that ground surface G. The carcass 53 is flexible and resiliently deformable so as to be wrapped around the track engaging assembly 50 and be resiliently deformed in response to the wheels 60, 62 rolling on their respective wheel path 72 and applying a load on the endless track 52.

Referring to FIGS. 4 and 5, a base 92 is defined on either side of each one of the lugs 74. The base 92 corresponds to the region where the wheel path 72 ends and where the lug 74 projects from the carcass 53. A side wall 94 extends from the base 92 and vertically away from the carcass 53. In the present embodiment, the sidewall 94 has different regions 94*a*, 94*b*, 94*c* that are engageable by the wheels 60, 62 under certain conditions, as will be described further below. In the present embodiment, the base 92 has a fillet 96 extending between the region 94*a* of the side wall 94 and a track side portion 110 of the wheel path 72. The fillet 96 has a bottom 98 being distanced from the top wall 86 of the opposite traction projection 82 by a distance 169 (FIG. 5) when the load L0 is applied by the wheel 60.

Still referring to FIGS. 4 and 5, the wheel path 72 on which the support wheel 60 rolls on will be further described. The wheel path 72 has the track side portion 110 extending adjacent the bases 92 of the lugs 74. The track side portion 110 is distanced from the top wall 86 of the opposite traction projection 82 by a distance 170. Another track side portion 112 extends opposite the track side portion 110. The track side portion 112 is distanced from the top wall 86 of the opposite traction projection 82 by a distance 172. In the present embodiment, distance 170 is substantially equal to distance 172, but they could differ in other embodiments. For example, distance 170 could be larger than distance 172. In other embodiments, distance 170 could be smaller than distance 172.

An intermediate track portion 114 is located between the track side portions 110, 112. As best seen in FIG. 5, the intermediate track portion 114 defines a track apex 116 in a central region thereof. It is contemplated that the track apex 116 could be located closer to one of the track side portions 110, 112 in some embodiments, which could assist in spreading the load applied by the wheel 60 away from the base 92 of the lug 74. The track apex 116 is distanced from the top wall 86 of the opposite traction projection 82 by a distance 174. Distance 174 is greater than distance 170 and greater than distance 172. The cross-section of the carcass 53 at the wheel path 72 is arcuate and has the intermediate track portion 114 and the track side portions 110, 112 define a convex profile best seen in FIG. 5. It is contemplated that, in other embodiments, the intermediate track portion 114 and the track side portions 110, 112 could be disposed relative to one another to define other shapes, such as a V-shape (FIG. 16A), a cosine shape (FIG. 16B), a sine shape (FIG. 16C), a truncated triangle shape (FIG. 16D), a dome shape (FIG. 16E), and a trapezoidal shape (FIG. 16F).

Still referring to FIGS. 4 and 5, the support wheel 60 has a hub portion 140 defining a rotation axis 142 of the support wheel 60. The hub portion 140 is connectable to an axle assembly of the support wheel assembly 58*b*. A resilient annular rim portion 144 is connected to the hub portion 140. The resilient annular rim portion 144 has an engagement surface 150 extending circumferentially around the rotation axis 142. The engagement surface 150 includes a wheel side portion 152, another wheel side portion 154 opposite the wheel side portion 152, and an intermediate wheel portion 156 located between the wheel side portions 152, 154. The wheel side portions 152, 154 and the intermediate wheel portion 156 are distanced from the rotation axis 142 by a distance 175 when the load L0 is applied, and the engagement surface 150 thus has a substantially flat profile.

Referring to FIG. 5, since the track system 40 supports the load L0 and that the engagement surface 150 of the wheel 60 has a substantially flat profile, a gap 160 is defined between the track side portion 110 and the wheel side portion 152, and a gap 162 is also defined between the track side portion 112 and the wheel side portion 154. It is contemplated that in some embodiments, the gaps 160, 162 could be absent when the load L0 is applied, depending on the profile of the cross-section of the carcass 53 at the wheel path 72. The intermediate wheel portion 156 engages the intermediate track portion 114, the intermediate wheel portion 156 and the intermediate track portion 114 are resiliently deformed and the wheel 60 transfers the load L0 through the carcass 53 to the opposite traction projection 82. In this state, distance 174 is greater than distance 169. It is contemplated that, in other embodiments, the intermediate wheel portion 156 could be not resiliently deformed by an appreciable amount when the load L0 is applied.

Figure 6:
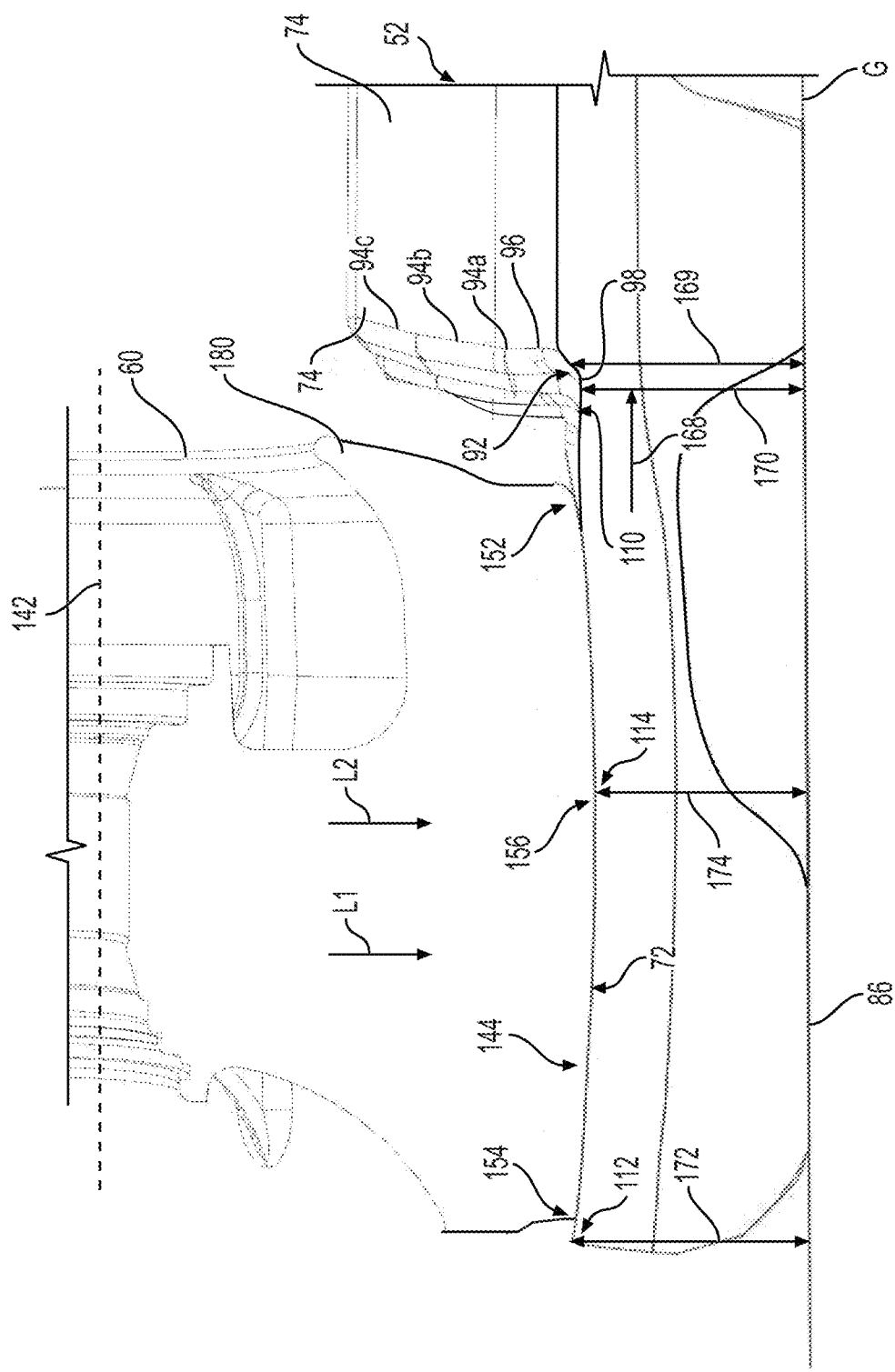
FIG. 6 is a close-up view of the portion 5 of FIG. 4, with the track system supporting a load being equal or greater than the nominal load.

Referring to FIG. 6 where the track system 40 supports the load L1, the increased load L1 compared to the load L0 of the state presented in FIGS. 4 and 5 causes the intermediate track portion 114 and the intermediate wheel portions 156 to be resiliently deformed further. In this state, the wheel side portion 152 engages the track side portion 110, and the wheel side portion 154 engages the track side portion 112 such that no gaps are defined therebetween. The distance 174 is now reduced and is smaller than distance 169. It is contemplated that, in other embodiments, the structure and composition of the carcass 53 and the annular rim portion 144 could be selected such that the distance 174 is substantially equal to distance 169. It is contemplated that should the load L2 (as indicated in FIG. 6) be supported by the track system 40, the distance 174 could be even smaller in some embodiments. The distance 174 is also smaller than the distance 170 and smaller than the distance 172. It is contemplated that the distance 174 could be substantially equal to the distance 170 and/or the distance 172 is some embodiments when the load L1 is applied.

The resilient deformation of the carcass 53 and the resilient annular rim portion 144 under the wheel 60 assists in distributing the load L1 applied by the wheel 60 away from the base 92 of the lug 74, which in turn may assist in reducing the shear stress induced at the base 92. In other words, the load distribution is more even across the wheel-facing side 70 of the track 52 and across the wheel path 72, compared to having a zone of relatively high stress near the base 92 of the lug 74 due to the edge of the wheel side portion 152 inducing a high shear stress at this location. In some circumstances, the compression of the carcass 53 at the wheel path 72 results in a lateral compression at the base 92 of the lug 74, as indicated by arrow 168 on FIG. 6. Crack initiation and/or propagation is therefore mitigated at the base 92 and/or in the track side portion 110 since the resilient elastomeric material of the carcass 53 is compressed laterally toward the base 92 of the lug 74. Furthermore, this configuration of the carcass 53 and the support wheel 60 may assist in reducing heat build up in the support wheel 60 and/or the track 52 under certain circumstances, which may improve the durability of the track 52.

Figure 7:
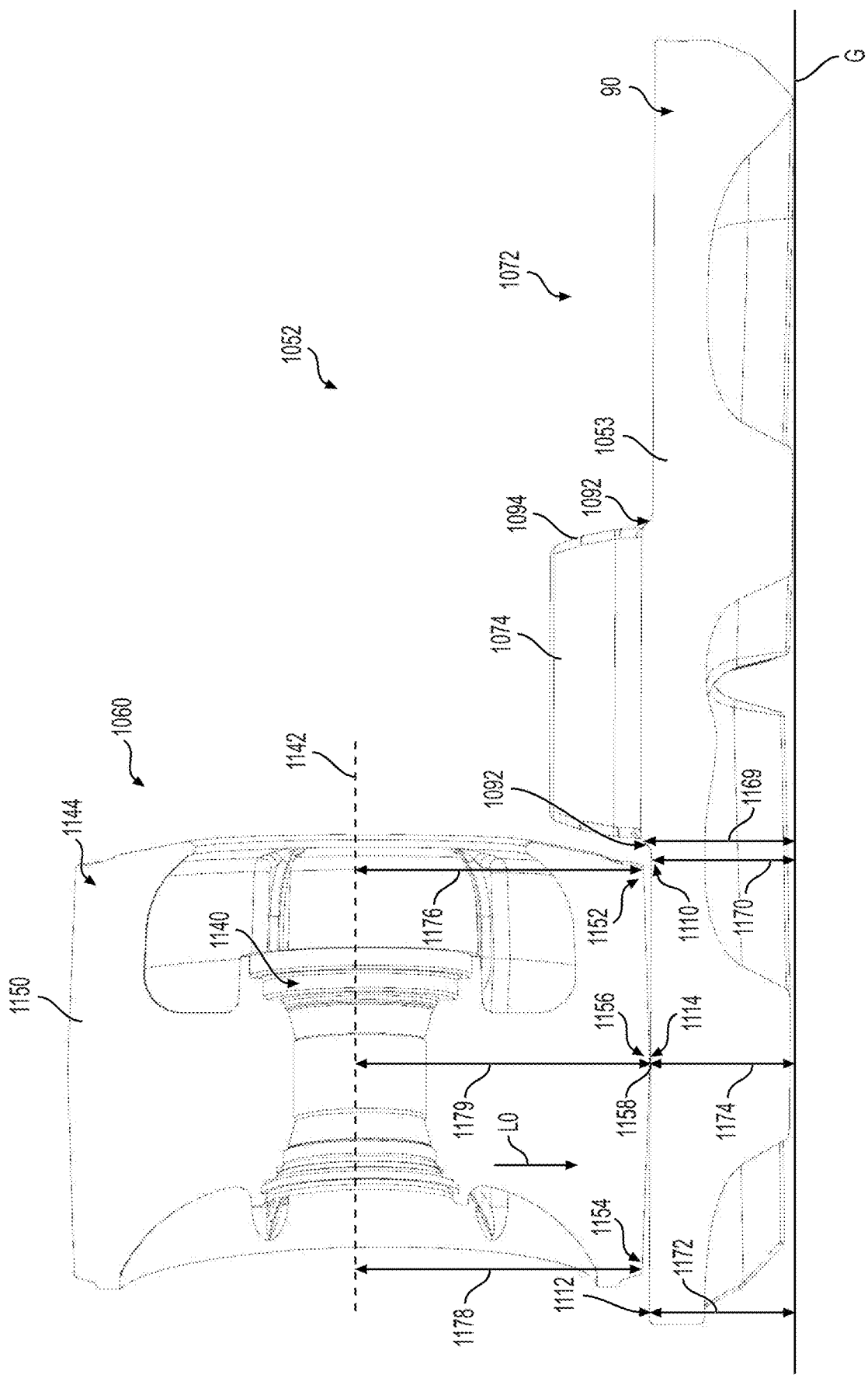
FIG. 7 is a cross-section view of another embodiment of the track and support wheel of FIG. 3, with the track having a wheel path with a flat profile, the support wheel having an engagement surface with a convex profile, and the track system supporting a load being smaller than a nominal load.
Figure 8:
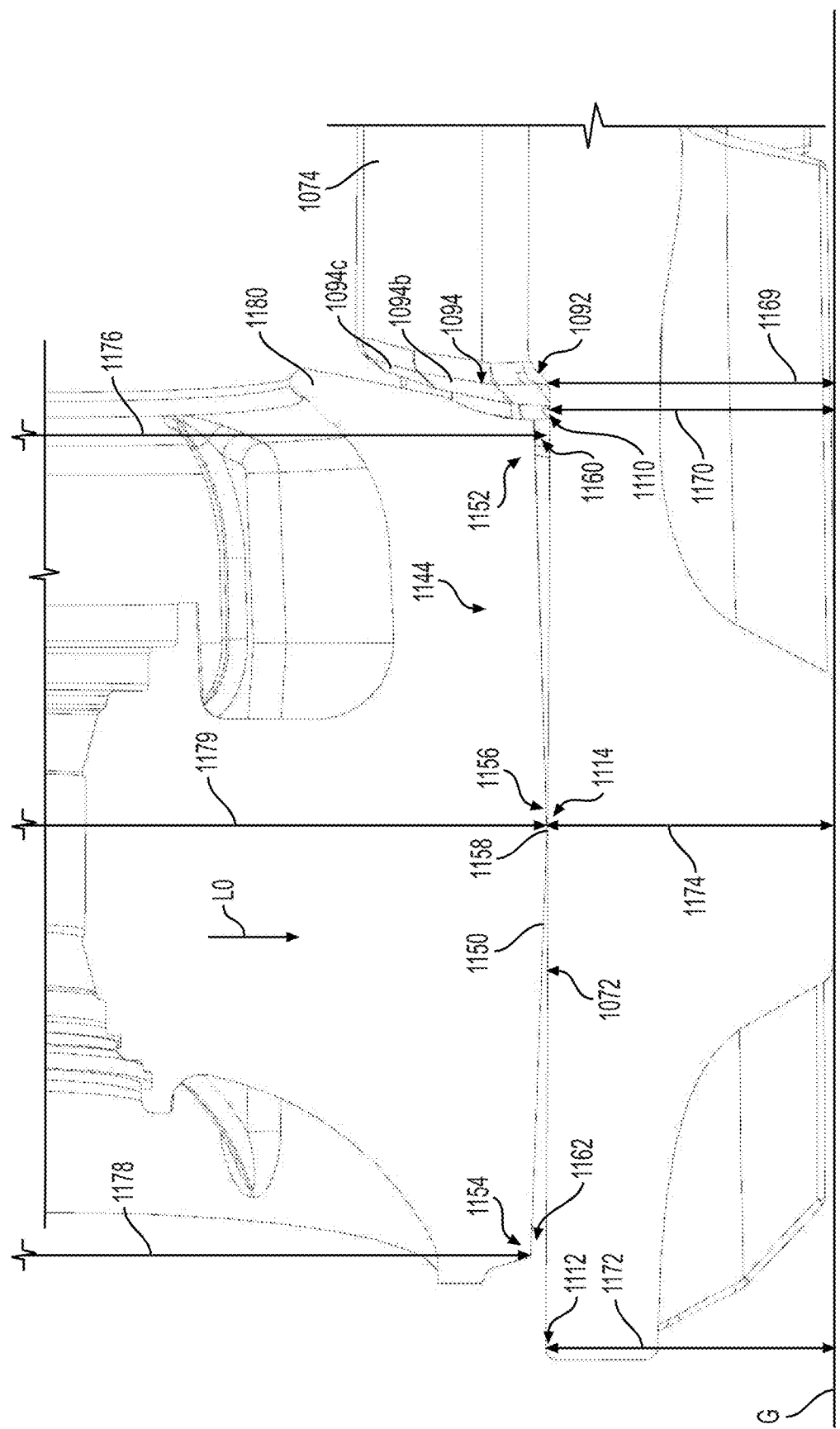
FIG. 8 is a close-up view of portion 8 of FIG. 7.
Figure 9:
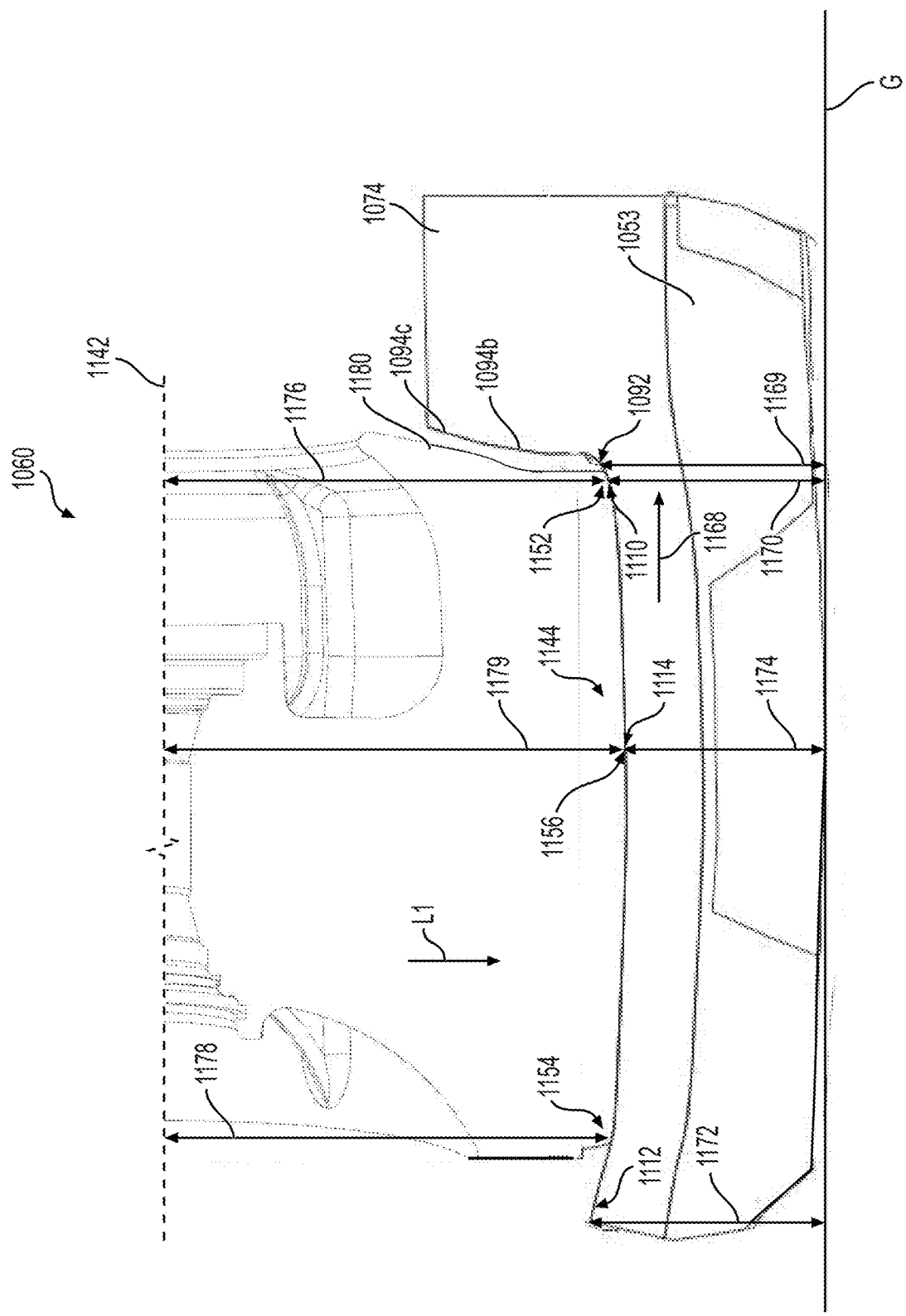
FIG. 9 is a close-up view of portion 8 of FIG. 7, with the track system supporting a load being equal or greater than the nominal load.

Referring now to FIGS. 7 to 9, a track 1052 and a wheel 1060 being other embodiments of the present technology and suitable for the track system 40 will be described. Several components of the track 1052 and wheel 1060 are the same or similar to the components of the track 52 and wheel 60 described above. Therefore, for simplicity, components of the track 1052 and wheel 1060 that are the same as or similar to those of the track 52 and wheel 60 have been labeled with the same reference numerals, but in the 1000 series, and will not be described in detail unless otherwise mentioned.

The track 1052 differs from the track 52 in that the distances 1170, 1172 and 1174 are substantially equal, and that the cross-section of the carcass 53 at the wheel path 72 has a substantially flat profile. The wheel 1060 differs from the wheel 60 in that the resilient annular rim portion 1144, which has the engagement surface 1150, has a different profile, at least when the load L0 is applied. The wheel side portion 1152 is distanced from the rotation axis 1142, which is defined by the hub portion 1140, by a distance 1176. The wheel side portion 1154 is distanced from the rotation axis 1142 by a distance 1178. In the present embodiment, distance 1178 is substantially equal to distance 1176, but they could differ in other embodiments. The intermediate wheel portion 1156 is distanced from the rotation axis 1142 by a distance 1179. Distance 1179 is greater than distance 1176 and distance 1176. The intermediate wheel portion 1156 defines a wheel apex 1158. In this embodiment, distance 1179 extends between the wheel apex 1158 and the rotation axis 1142. The cross-section of the resilient annular rim portion 1144 is arcuate and has the intermediate wheel portion 1156 and the wheel side portions 1152, 1154 define a convex profile. It is contemplated that, in other embodiments, the intermediate wheel portion 1156 and the wheel side portions 1152, 1154 could be disposed relative to one another to define other shapes, such as a V-shape, a sine shape, a cosine shape, a truncated triangle, a dome shape, and a trapezoidal shape as presented in FIGS. 16A-16F respectively. In other embodiments, it is also contemplated that the wheel apex 1158 could be located closer to one of the wheel side portions 1152, 1154. Such positioning of the wheel apex 1158 could assist in spreading the load applied by the wheel 1060 further away from the base 1092 of the lug 1074.

Referring to FIG. 8, since the track system 40 supports the load L0 and that the cross-section of the carcass 1053 at the wheel path 1072 has a substantially flat profile, a gap 1160 is defined between the track side portion 1110 and the wheel side portion 1152, and a gap 1162 is also defined between the track side portion 1112 and the wheel side portion 1154. The intermediate wheel portion 1156 engages the intermediate track portion 1114, the intermediate wheel portion 1156 and the intermediate track portion 1114 are resiliently deformed and the wheel 1060 transfers the load through the carcass 1053 to the opposite traction projection 1084. In this state, the distance 1179 is greater than distance 1176 and greater than distance 1178. It is contemplated that, in other embodiments, the intermediate wheel portion 1156 could be not resiliently deformed by an appreciable amount when the load L0 is applied.

Referring to FIG. 9 where the track system 40 supports the load L1, the increased load L1 compared to the load L0 of the state presented in FIGS. 7 and 8 causes the intermediate wheel portion 1156 and the intermediate track portion 1114 to be resiliently deformed further. In this state, the wheel side portion 1152 engages the track side portion 1110, and the wheel side portion 1154 engages the track side portion 1112 such that no gaps are defined. The distance 1179 is now reduced to be substantially equal to distance 1176 and distance 1178. It is contemplated that should the load L2 be supported by the track system 40, the distance 1179 could be smaller than distance 1176 and/or distance 1178 in some embodiments.

The resilient deformation of the carcass 1053 and the annular rim portion 1144 under the wheel 1060 assists in distributing the load applied by the wheel 1060 away from the base 1092 of the lug 1074, which in turns may assist in reducing the shear stress induced at the base 1092. In other words, the load distribution is more even across the wheel-facing side 1070 of the track 1052 and across the wheel path 1072, compared to having a zone of relatively high stress near the base 1092 of the lug 1074 due to the edge of the wheel side portion 1152 inducing a high shear stress at this location. In some circumstances, the compression of the carcass 1053 at the wheel path 72 results in a lateral compression at the base 1092 of the lug 1074, as indicated by arrow 1168 on FIG. 9. Crack initiation and/or propagation is therefore mitigated at the base 1092 and/or in the track side portion 1110 since the resilient elastomeric material of the carcass 1053 is compressed laterally toward the base 1092 of the lug 1074. Furthermore, the present configuration of the carcass 1053 and the support wheel 1060 may assist in reducing heat build up in the support wheel 1060 and/or the track 1052 under certain circumstances, which may improve the durability of the track 1052.

Figure 10:
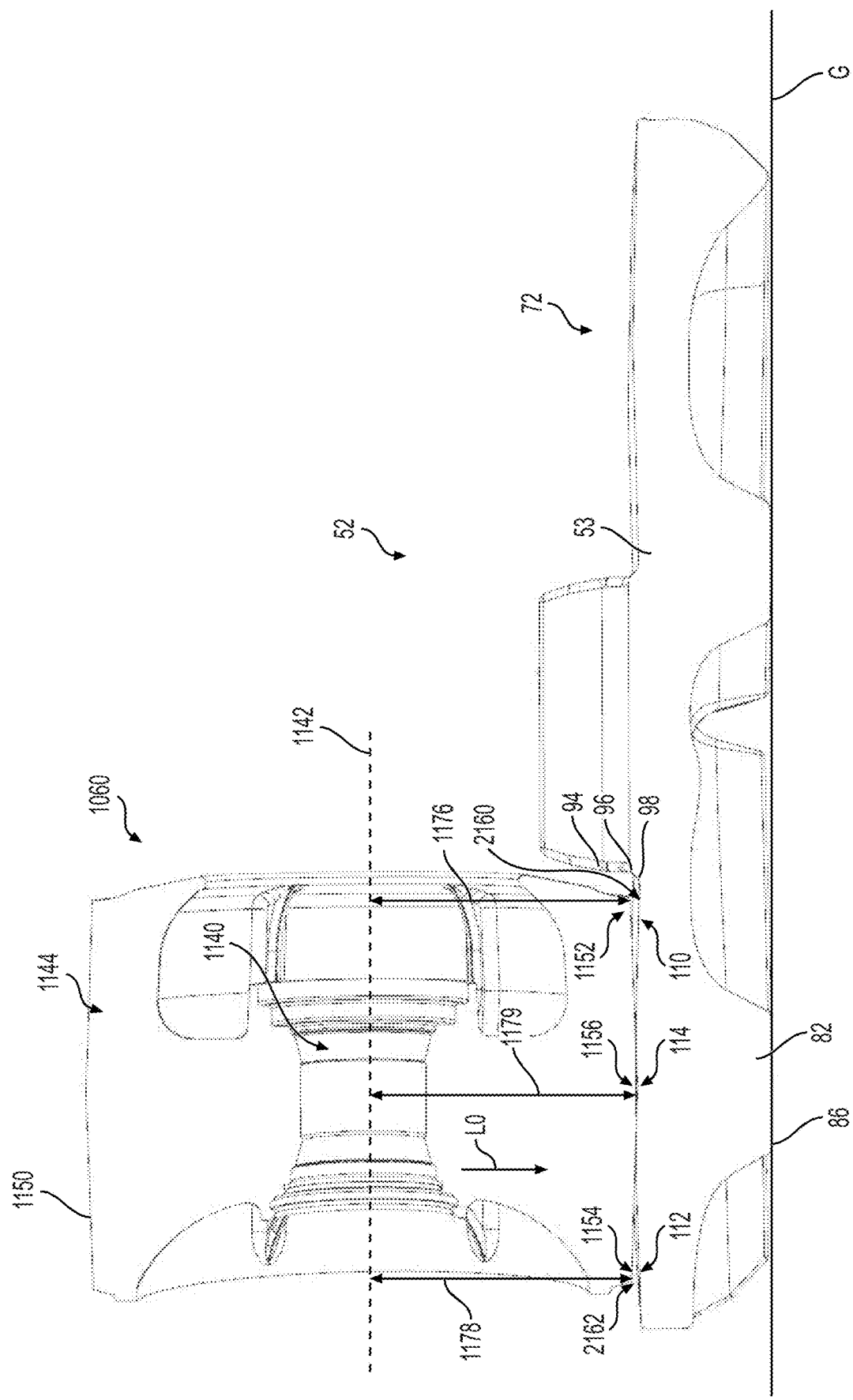
FIG. 10 is a cross-section view of yet another embodiment of the track and support wheel of FIG. 3, with the track having a wheel path with a convex profile, the support wheel having an engagement surface with a convex profile, and the track system supporting a load being smaller than a nominal load.
Figure 11:
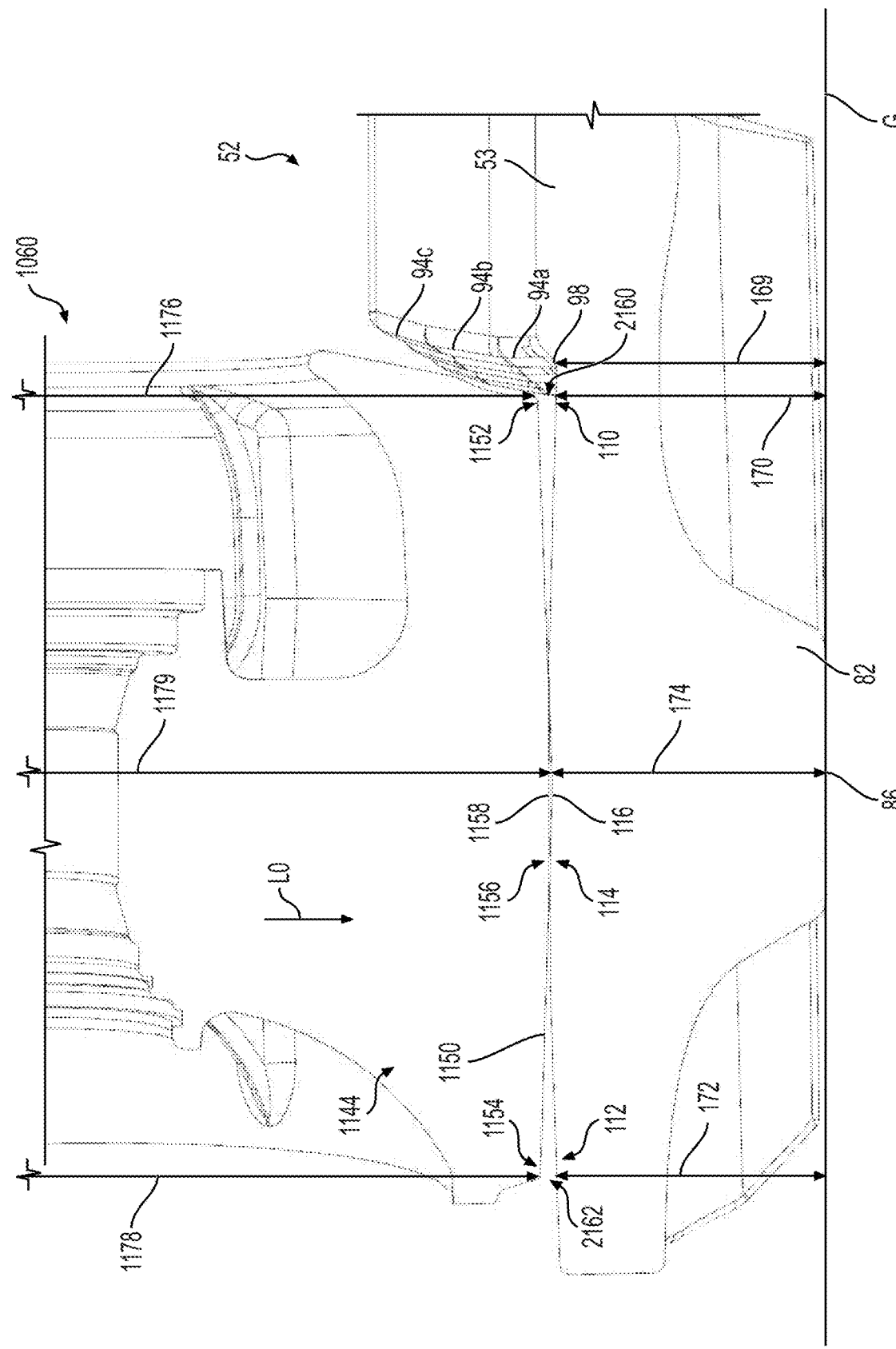
FIG. 11 is a close-up view of portion 11 of FIG. 10.
Figure 12:
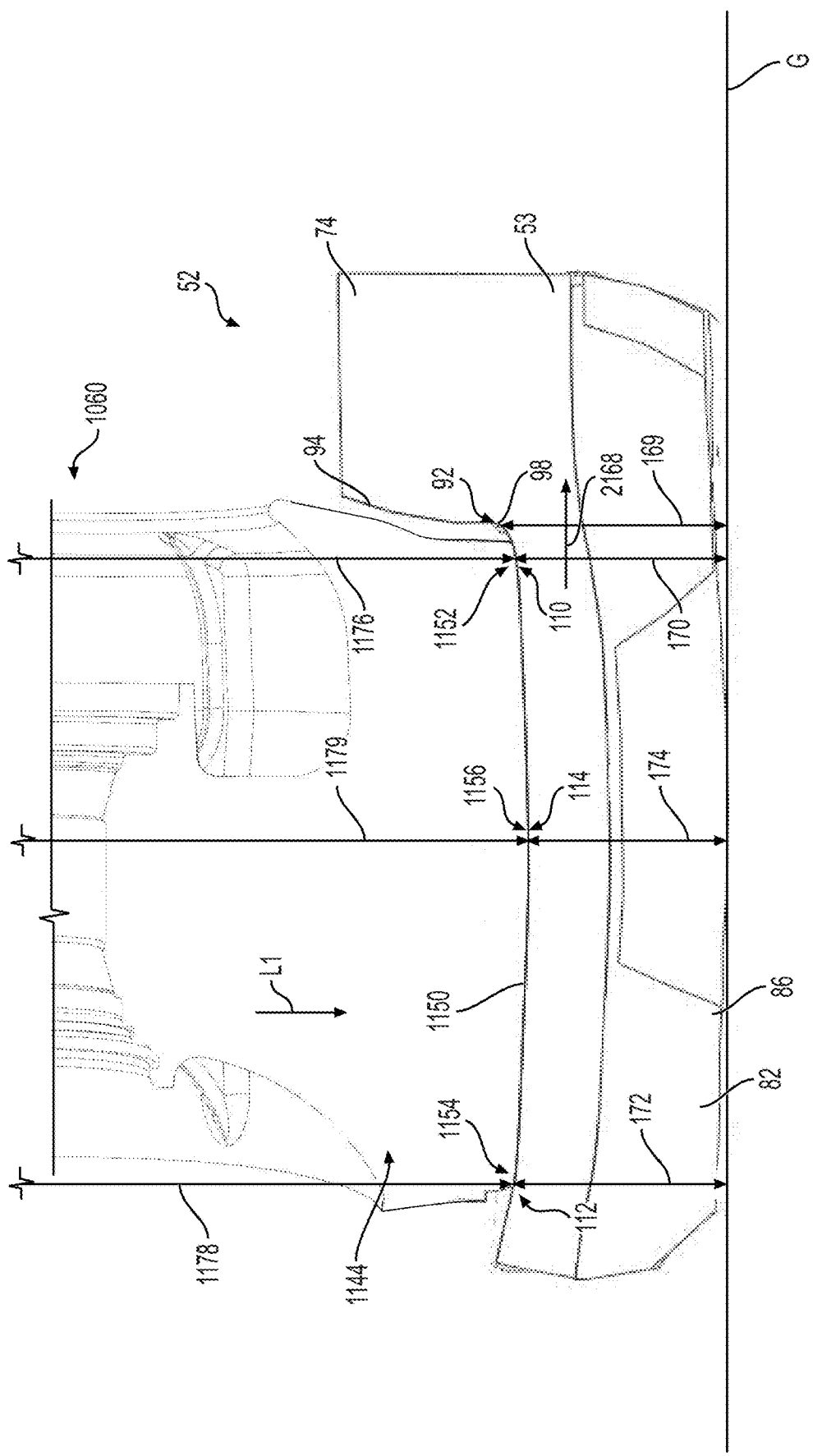
FIG. 12 is a close-up view of portion 11 of FIG. 10, with the track system supporting a load being equal or greater than the nominal load.

Referring now to FIGS. 10 to 12, the track 52 and the wheel 1060 described above are combined in another embodiment of the present technology being suitable for the track system 40. For simplicity, the same reference numerals as presented above for the track 52 and the wheel 1060 respectively will be used, unless otherwise mentioned.

Referring to FIGS. 10 and 11, since the cross-section of the carcass 53 at the wheel path 72 and the cross-section of the resilient annular rim portion 1144 have a convex profile and when the track system 40 supports the load L0, a gap 2160 defined between the track side portion 110 and the wheel side portion 1152 is greater than the gap 160 (FIG. 5), and a gap 2162 defined between the track side portion 112 and the wheel side portion 1154 is greater than the gap 162. The intermediate wheel portion 1156 engages the intermediate track portion 114, the intermediate wheel portion 1156 and the intermediate track portion 114 are resiliently deformed and the wheel 1060 transfers the load through the carcass 53 to the opposite traction projection 84. In this state, distance 1179 is greater than distance 1176 and distance 1178, and distance 174 is greater than distance 170 and greater than distance 172.

Referring to FIG. 12 where the track system 40 supports the load L1, the increased load L1 compared to the load L0 of the state presented in FIGS. 10 and 11 causes the intermediate wheel portion 1156 and the intermediate track portion 114 to be resiliently deformed further. In this state, the wheel side portion 1152 engages the track side portion 110, and the wheel side portion 1154 engages the track side portion 112 such that the gaps 2160, 2162 are no longer defined. The distance 1179 is now reduced to be substantially equal to distance 1176 and distance 1178. The intermediate wheel portion 1156 thus extends closer to the rotation axis 1142 in FIG. 12 than it does in FIGS. 10 and 11. It is contemplated that, in other embodiments, distance 1179 could be substantially equal to distance 1176 or distance 1178 when the load L1 or L2 is applied. The distance 174 is also reduced to be substantially equal to distance 170 and distance 172. It is contemplated that, in other embodiments, distance 174 could be substantially equal to distance 170 or distance 172 when the load L1 or L2 is applied. Distance 174 is also smaller than distance 169 when the load L1 is applied, but distance 174 could be substantially equal to distance 169 in some embodiments when the load L1 is applied. The intermediate track portion 114 thus extends closer to the top wall 86 of the opposite traction projection 84 on the ground-facing side 80 of the track 52 when the load L1 is applied than when the load L0 is applied (FIG. 11).

The resilient deformation of the carcass 53 and the annular rim portion 1144 under the wheel 1060 assists in distributing the load applied by the wheel 1060 away from the base 92 of the lug 74, which in turn may assist in further reducing the shear stress induced at the base 92 compared to the embodiments shown in the FIGS. 4 to 9. The resilient deformation of the carcass 53 and the annular rim portion 1144 under the wheel 1060 assists in distributing the load applied by the wheel 1060 away from the base 92 of the lug 74, which in turn may assist in reducing the shear stress induced at the base 92. In other words, the load distribution is more even across the wheel-facing side 70 of the track 52 and across the wheel path 72, compared to having a zone of relatively high stress near the base 92 of the lug 74 due to the edge of the wheel side portion 1152 inducing a high shear stress at this location. In some circumstances, the compression of the carcass 53 at the wheel path 72 results in a lateral compression at the base 92 of the lug 74, as indicated by arrow 2168 on FIG. 12. Because of the combined effects of the convex profile of the annular rim portion 1144 and the convex profile of the carcass 53 at the wheel path 72, it is contemplated that, at least in some circumstances, the amount of lateral compression at the base 92 of the lug 74 is greater in this embodiment than in the other embodiments presented above for a same load applied by the wheel 1060 to the track 52. Crack initiation and/or propagation is therefore mitigated at the base 92 and/or in the track side portion 110 since the resilient elastomeric material of the carcass 53 is compressed laterally toward the base 92 of the lug 74. Furthermore, the present configuration of the carcass 53 and the support wheel 1060 may further assist in reducing heat build up in the support wheel 1060 and/or the track 52 under certain circumstances, which may improve the durability of the track 52.

Referring back to FIGS. 5 and 8, the wheels 60, 1060 have a flange 180, 1180 connected to the respective annular rim portion 144, 1144. The flanges 180, 1180 extend adjacent to the side walls 94, 1094 of the lugs 74, 1074. When the wheels 60, 1060 roll on the wheel path 72, 1072 and support the load L0, the respective portions 94b, 1094b of the side walls 94, 1094 are engageable by the corresponding flange 180, 1180 for maintaining the track 52, 1052 aligned in the widthwise direction. When the wheels 60, 1060 roll on the wheel path 72, 1072 and support the load L1, the respective portions 94b, 94c, and 1094b, 1094c of the side walls 94, 1094 are engageable by the corresponding flange 180, 1180 for maintaining the track 52, 1052 aligned in the widthwise direction (FIGS. 6 and 9). In other words, when the load in increased, the flanges 180, 1180 are sized and configured to be engaged to a larger portion of the side walls 94, 1094 of the lugs 74, 1074, which in turn reduces the amount of shear stress applied to the base 92, 1092 of the lugs 74, 1074 during operation of the track system 40 and improves the durability of the track 52, 1052.

Figure 13:
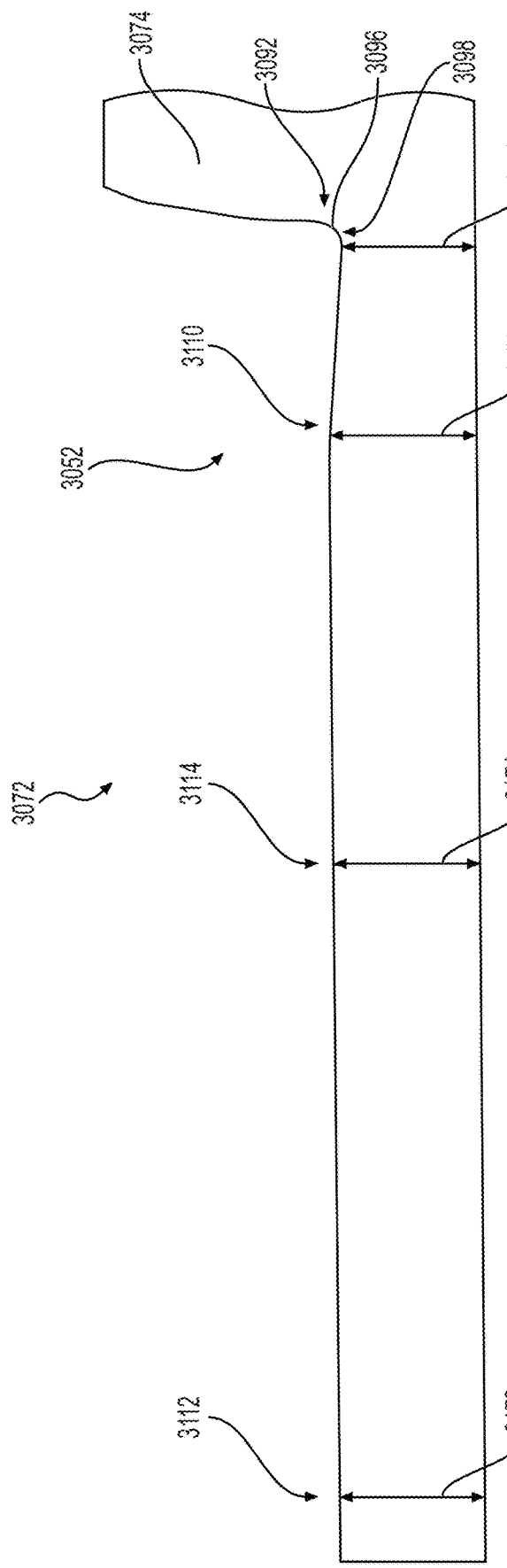
FIG. 13 is a close-up, vertical and lateral cross-section view of a wheel path and lug of yet another embodiment of the track of FIG. 3.

Referring now to FIG. 13, a track 3052 being another embodiment of the present technology and suitable for the track system 40 will be described. Several components of the track 3052 are the same or similar to the components of the track 52 described above. Therefore, for simplicity, components of the track 3052 that are the same as or similar to those of the track 52 have been labeled with the same reference numerals, but in the 3000 series, and will not be described in detail unless otherwise mentioned.

In the track 3052, the wheel path 3072 extends substantially flat between the track side portions 3110, 3112 and 3114, and thus distances 3170, 3172, 3174 are substantially equal. The base 3092 of the lug 3074 differs from the ones shown in the other embodiments in that the fillet 3096 defines a bottom 3098 having a distance 3169 being smaller than distance 3170. The fillet 3096 extends upwardly from the bottom 3098 towards the track side portion 3110 (toward the left side on FIG. 13), creating a cross-section profile of the carcass 3053 at the wheel path 3072 this is also convex. It is contemplated that when a wheel having an annual rim portion with a flat profile (similar to the wheel 60) rolls on the wheel path 3072 and is supporting the load L1, distance 3169 becomes substantially equal to distances 3170, 3172, 3174. The above-mentioned effects of lateral compression of the carcass towards the base 3092 also appear, which in turn may assist in improving the durability of the track 3052.

Figure 14:
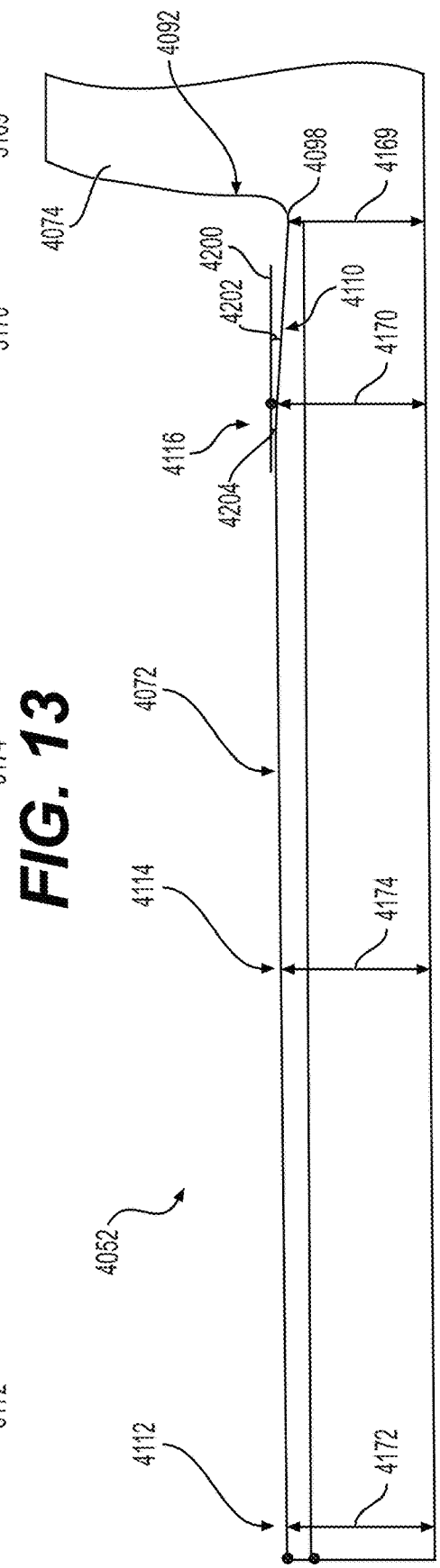
FIG. 14 is a close-up, vertical and lateral cross-section view of a wheel path of a track being yet another embodiment of the track of FIG. 3.

Referring to FIG. 14, a track 4052 being another embodiment of the present technology and suitable for the track system 40 will be described. Several components of the track 4052 are the same or similar to the components of the track 52 described above. Therefore, for simplicity, components of the track 4052 that are the same as or similar to those of the track 52 have been labeled with the same reference numerals, but in the 4000 series, and will not be described in detail unless otherwise mentioned.

In the track 4052, the drive lugs 4074 also extend between the wheel paths 4072, and the track apex 4116 is defined near the track side portion 4110 instead of being defined at the intermediate track portion 4114. Distance 4170 is thus greater than distance 4172 and distance 4174, and is also greater than distance 4169. The track apex 4116 is thus closer to the track side portion 4110 than the track side portion 4112. An angle 4202 defined between a horizontal plane 4200 and the surface of the wheel path 4072 extending between the track apex 4116 and the bottom 4098 is greater than an angle 4204 defined between the horizontal plane 4200 and the surface of the wheel path 4072 extending between the track apex 4116 and track side portion 4112. It is contemplated that when a wheel having an annual rim portion with a flat profile (similar to the wheel 60) rolls on the wheel path 4072 and is supporting the load L1, the above-mentioned effects of lateral compression of the carcass towards the base 4092 also appear, which in turn may assist in improving the durability of the track 4052.

Referring now to FIG. 15A, a track 5052 being another embodiment of the present technology and suitable for the track system 40 will be described. Several components of the track 5052 are the same or similar to the components of the track 52 described above. Therefore, for simplicity, components of the track 5052 that are the same as or similar to those of the track 52 have been labeled with the same reference numerals, but in the 5000 series, and will not be described in detail unless otherwise mentioned.

The track 5052 has undercuts 5099 defined in the base 5092 of the lug 5074. Each undercut 5099 defines a recess 5100 extending inwardly towards a lateral center 5104 of the track 5052 further than the portion 5094a of the corresponding side wall 5094. Each undercut 5099 has a bottom 5098, and the distance 5169 extends between the bottom 5098 of the undercut 5099 and the ground-facing side of the track (represented by the top wall 5086). This configuration of the base 5092 of the lug 5074 may also assist in reducing the amount of shear stress induced at the base 5092 of the lug 5074 when wheels (not shown) roll on the wheel path 5072 and support the load L1. This configuration of the base 5092 of the lug 5074 is contemplated to be used with any one of the configurations of the tracks and wheels presented above.

Referring to FIG. 15B, a track 6052 being another embodiment of the present technology and suitable for the track system 40 will be described. Several components of the track 6052 are the same or similar to the components of the track 52 described above. Therefore, for simplicity, components of the track 6052 that are the same as or similar to those of the track 52 have been labeled with the same reference numerals, but in the 6000 series, and will not be described in detail unless otherwise mentioned.

The track 6052 has undercuts 6099 defined in the base 6092 of the lug 6074 and in the track side portions 6110 of the wheel paths 6072. Each undercut 6099 defines a recess 6100 extending inwardly towards a lateral center 6104 of the track 6052 further than the portion 6094a of the corresponding side wall 6094. A bottom 6098 of each undercut 6099 extends vertically below the intermediate track portion 6114 and the track side portion 6112. The distance 6169 is defined between the bottom 6098 of the undercut 6099 and the top wall 6086 of the traction projection 6082 of the track 6052. This configuration of the base 6092 of the lug 6074 may also assist in reducing the amount of shear stress induced at the base 6092 of the lug 6074 when wheels (not shown) roll on the wheel path 6072 and support the load L1. This configuration of the base 6092 of the lug 6074 is also contemplated to be used with any one of the configurations of the tracks and wheels presented above.

The tracks 52, 1052, 3052, 4052, 5052, 6052, the wheels 60, 1060, 62 and the track systems 40 implemented in accordance with some non-limiting embodiments of the present technology can be represented as presented in the following numbered clauses.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track for a track system, the track comprising:
an endless elastomeric carcass having a wheel-facing side defining a wheel path for engaging a plurality of wheels of the track system, and a ground-facing side opposite the wheel-facing side for engaging a ground surface,
a plurality of lugs projecting from the wheel-facing side, each lug of the plurality of lugs having a base and a side wall extending from the base, the base being distanced from the ground-facing side by a first distance;
the wheel path having a first track side portion extending adjacent the base of at least two lugs of the plurality of lugs;
wherein the base defines an undercut extending between the side wall and the first track side portion of the wheel path, the undercut defining a recess extending inwardly towards a lateral center of the track, the undercut having a bottom, and the first distance extends between the bottom of the undercut and the ground-facing side of the track.

2. The track of claim 1, wherein the wheel path further has:
a second track side portion opposite the first track side portion, and
an intermediate track portion located between the first and second track side portions, the intermediate track portion being distanced from the ground-facing side by a second distance.

3. The track of claim 2, wherein the bottom of the undercut extends vertically below the intermediate track portion and the second track side portion.

4. The track of claim 1, wherein the recess extends laterally toward the lateral center further than at least a portion of the side wall.

5. A track system for a vehicle, the track system comprising:
the track as defined in claim 1; and
a track-engaging assembly including a wheel configured for rolling on the wheel path.

6. The track of claim 2, wherein:
the first track side portion is distanced from the ground-facing side by a third distance;
the second track side portion is distanced from the ground-facing side by a fourth distance;
the intermediate track portion defines a track apex being distanced from the ground-facing side by the second distance being greater than at least one of the first, third and fourth distances.

7. The track of claim 6, wherein the second distance is greater than the third and fourth distances.

8. The track of claim 6, wherein the track apex is located laterally closer to the first track side portion than to the second track side portion.

9. The track of claim 6, wherein a cross-section of the elastomeric carcass at the wheel path has a shape being one of an arcuate shape, a V-shape, a cosine shape, a sine shape, a truncated triangle shape, a dome shape, and a trapezoidal shape.

* * * * *